Reissued Sept. 10, 1940

Re. 21,552

UNITED STATES PATENT OFFICE 21,552

PRODUCTION OF ABRASIVE MATERIAL

Raymond C. Benner and Romie L. Melton, Niagara Falls, N. Y., assignors, by mesne assignments, to The Carborundum Company, Niagara Falls, N. Y., a corporation of Delaware No Drawing. Original No. 2,078,831, dated April 27, 1937, Serial No. 56,704, December 30, 1935. Application for reissue May 9, 1940, Serial No. 334,238

9 Claims. (Cl. 51—298)

This invention relates to improved abrasive articles and methods of manufacturing the same. More specifically the invention is concerned with coated abrasive products such as abrasive sheets, belts, disks and the like.

The use of resinous products in the manufacture of coated abrasive articles has been proposed previously but, the use of these materials is retarded because they require a long heat treatment to set up or cure the resins to a point where they bond the abrasive grains to the backing with sufficient strength. This is a disadvantage in that prolonged heat treatment weakens the backing material such as paper and cloth commonly employed in the manufacture of coated abrasives, and the speed at which abrasive paper machines are operated require that a very considerable quantity of material be stored up, as in festoons, when the material has to be treated for a long time to set up the binder.

We have discovered that if coated abrasive products employing a binder containing a synthetic resin are subjected to the action of certain catalysts the hardening of the resin binder is very materially hastened. In some cases resins may be hardened completely at ordinary room temperatures when catalysts are added and in other cases a heat treatment is employed to still further hasten the hardening process. This heat treatment may be at a much lower temperature than ordinarily required to cure the resin. In general the action of the catalyst is increased by a rise in temperature, but in any event it is possible to reduce the time and temperature required to set up the resinous material to such an extent that the use of these resinous binders is economically practical.

We will now illustrate our invention with a number of specific examples, it being understood that these examples are for purposes of illustration only.

*Example I*

Paper of a character commonly employed in the manufacture of coated abrasives such as sandpaper is coated with a layer of liquid heat-hardenable phenol formaldehyde condensation product in the "A" stage and abrasive grains by methods commonly employed in the manufacture of flexible coated abrasives.

The coated surface of the paper is then sprayed with a solution of 1 part of concentrated sulphuric acid in 25 parts of ethyl alcohol to form a thin film of catalyst thereon.

The coated paper is then heated at about 290° F. for about 30 seconds to harden the resin coating and attach the abrasive grains firmly to the backing material.

*Example II*

Fabric coated with liquid phenol formaldehyde resin and abrasive grains as in Example I has applied to the coated surface thereof a thin coating of a solution of 5 grams of aluminum chloride in 125 cc. of ethyl alcohol by suitable means, for example by means of a spray. The coated fabric is then heated for approximately 1 minute at 300° F. in which time the resin sets up to a hard film which effectively attaches the abrasive grains to the backing. The coated paper is then wound into a roll.

*Example III*

A backing such as paper or cloth is coated with a varnish of an oil-extended phenol-modified alkyd resin and abrasive grains in the usual manner. The coated surface is then treated, e. g. by spraying with a solution of 1 part of concentrated sulphuric acid in 40 parts of ethyl alcohol and heated to 300° F. for approximately 1 minute. In this time the varnish sets to a film which is hard, smooth and flexible, and attaches the abrasive grains firmly to the backing. The article is then wound into a roll and additionally heated to further cure the resin.

*Example IV*

A backing material is coated with abrasive grains and a petroleum naphtha solution of an alkyd resin free from phenol or resin modifying agents. The coated surface is then treated, e. g. sprayed, with a solution of about 1 part of sulphuric acid in about 40 parts of ethyl alcohol. The article is heated to 300° F. for one minute. After this treatment the film is non-tacky and flexible and in such condition that the coated backing can be rolled up and given an additional hardening treatment.

*Example V*

A normally liquid phenol formaldehyde condensation product containing 2% of ferric chloride ground in the resin is applied to a backing material and abrasive grains then distributed over the resin coating. The article may then be allowed to stand for about 7 days at room temperature (70 to 75° F.) at the end of which time it will be found that the resin has set up to a firm solid consistency, attaching the grains to the backing. The article may then be wound into a roll and heat treated to cure the resin.

*Example VI*

A making coat of adhesive made according to the following formula:

| | Grams |
|---|---|
| Phenol-aldehyde casting resin | 1300 |
| Liquid acid catalyst | 104 |
| Denatured alcohol | 130 |

is applied to a backing which may be 130# cylinder paper, at the rate of 1.8 lbs. per ream. 80 grit fused alumina is distributed thereon at the rate of 19.5 lbs. per ream. The thus coated paper is cured for about four hours at room temperature and one hour at about 70° C. The coated paper is then sized with an adhesive made according to the following formula:

| | Grams |
|---|---|
| Phenol-aldehyde casting resin | 1000 |
| Liquid acid catalyst | 80 |
| Denatured alcohol | 355 |

and then air-dried over night and then cured about two hours at about 70° C. This method has the advantage over prior methods that the low temperature cure made possible by the catalyst does not harm the backing.

As illustrated by the examples our invention is subject to a number of modifications. For example, the catalyst may be mixed in with the resinous material, in which case it should be applied to the backing within a few hours, or the resin may be spread over the backing and the catalyst then applied to the resin film. The resin coating may also be cured in an atmosphere containing a catalyst such as gaseous hydrochloric acid. The catalyst may also be added with the grain, as a powder mixed with or attached to the grain or as a solution moistening the grain. It is also within the scope of the invention to rely entirely on the action of the catalyst under ordinary temperature conditions or the article may be heated to hasten the hardening of the resin. We have also found it desirable at times to subject the article to a heat treatment while the web of material is being fed through the abrasive making machine, as for example, by passing the coated side of the surface under suitable heating elements such as electrical heaters, followed by further heat treatment of the article after it has been wound into a roll.

Catalysts other than those specifically mentioned in the examples have been found to be suitable, including both acids and bases, as well as so-called acid salts such as aluminium chloride or ferric chloride.

It is also within the scope of our invention to selectively vary the stiffness and flexibility of the finished material by varying the kind and quantity of catalyst and the time and temperature of heat treatment. For example in the above illustrations the time of curing may be lengthened to produce a more brittle article and the quantity of catalyst may be reduced to produce a more flexible article.

We claim:

1. The method of making abrasive coated products which comprises coating a backing material with a liquid resin and applying abrasive grains and a catalyst for curing the resin to the resin coated side of the backing to cause the resin to solidify and attach the abrasive grains firmly to the backing.

2. The method of making abrasive coated products which comprises coating a backing material with abrasive grains and a liquid resinous material and applying a coating of liquid containing a catalyst for curing the resin to the coating on the backing to cause the resin to solidify and attach the abrasive grains firmly to the backing.

3. The method of making abrasive coated products which comprises coating a backing material with abrasive grains and a normally liquid phenolic condensation product and applying a catalyst to the resin coating to cause the liquid resin to solidify and attach the abrasive grains firmly to the backing.

4. The method of making abrasive coated products which comprises coating a backing material with abrasive grains and a normally liquid alkyd resin and applying a catalyst to the resin coating to cause the liquid resin to solidify and attach the abrasive grains firmly to the backing.

5. The method of making abrasive coated products which comprises coating a backing material with abrasive grains and an oil varnish containing a phenol-modified alkyd resin, and applying a catalyst for the resin to the varnish to cause the varnish to harden and attach the abrasive grains firmly to the backing.

6. In the manufacture of abrasive coated products the steps which comprise coating a backing material with abrasive grains, a liquid resinous material, and a catalyst of acid character which is adapted to solidify the liquid resinous material at ordinary temperatures, and solidifying the binder.

7. In the manufacture of abrasive coated articles in which a backing is coated with abrasive grains that are confined to the backing by an adhesive coating, the improved method which comprises bringing a liquid resin of the type which may be cured at an accelerated rate by a catalyst, to a condition of suitable coating viscosity, applying said resin so prepared and a suitable catalyst, which will accelerate the curing of said resin, to a backing, and then applying a coat of abrasive grains to said resinous layer on said backing while said resinous layer is in an adhesive condition.

8. In the manufacture of abrasive coated articles in which a backing is coated with abrasive grains that are confined to the backing by an adhesive coating, the improvement therein which comprises bringing to a condition of suitable coating viscosity, a normally liquid, synthetic resin of a type which is relatively stable at ordinary temperatures and capable of advancing to a more advanced stage of curing at a relatively slow rate at elevated temperatures, coating said backing with said prepared resin, applying to said layer a catalyst capable of hastening the curing of said resin, and abrasive grains, and subsequently subjecting the abrasive coated backing to conditions that advance the curing of said resin with the aid of said catalyst.

9. In the manufacture of abrasive coated articles in which a backing is coated with abrasive grains that are confined to the backing by an adhesive coating, the improvement therein which comprises applying to said backing a layer of a liquid, resinous material of the type which is relatively stable at ordinary temperatures and capable of accelerated advancement to a more advanced stage of curing under the influence of a catalyst, applying to said layer a catalyst, and a layer of abrasive grains, subjecting the coated backing to conditions that advance the curing of said resinous material with the aid of said catalyst to a stage less than full curing, then applying to the backing so prepared another liquid coating of such a resinous material, a solvent therefor and a catalyst for said resinous material, and subsequently subjecting this additionally coated backing to conditions that further advance the curing of said resinous materials with the aid of said catalysts.

RAYMOND C. BENNER.
ROMIE L. MELTON.